US012602809B2

(12) United States Patent
Wang et al.

(10) Patent No.: US 12,602,809 B2
(45) Date of Patent: Apr. 14, 2026

(54) MEASURING METHOD AND MEASURING APPARATUS OF BLOOD VESSEL DIAMETER OF FUNDUS IMAGE

(71) Applicant: SHENZHEN SIBRIGHT TECHNOLOGY CO., LTD., Shenzhen (CN)

(72) Inventors: Juan Wang, Shenzhen (CN); Bin Xia, Shenzhen (CN)

(73) Assignee: SHENZHEN SIBRIGHT TECHNOLOGY CO., LTD., Shenzhen (CN)

( * ) Notice: Subject to any disclaimer, the term of this patent is extended or adjusted under 35 U.S.C. 154(b) by 539 days.

(21) Appl. No.: 18/043,072

(22) PCT Filed: Apr. 29, 2021

(86) PCT No.: PCT/CN2021/091223
§ 371 (c)(1),
(2) Date: Feb. 27, 2023

(87) PCT Pub. No.: WO2022/048171
PCT Pub. Date: Mar. 10, 2022

(65) Prior Publication Data
US 2024/0005545 A1 Jan. 4, 2024

(30) Foreign Application Priority Data

Sep. 4, 2020 (CN) .......................... 202010924287.2

(51) Int. Cl.
*G06T 7/62* (2017.01)
*G06T 3/4007* (2024.01)
*G06T 7/12* (2017.01)

(52) U.S. Cl.
CPC .............. *G06T 7/62* (2017.01); *G06T 3/4007* (2013.01); *G06T 7/12* (2017.01);
(Continued)

(58) Field of Classification Search
CPC ........... G06T 7/62; G06T 3/4007; G06T 7/12; G06T 2207/20021; G06T 2207/20081;
(Continued)

(56) References Cited

U.S. PATENT DOCUMENTS

| | | | | |
|---|---|---|---|---|
| 2012/0236259 | A1* | 9/2012 | Abramoff | ................ A61B 3/12 |
| | | | | 351/246 |
| 2017/0100029 | A1* | 4/2017 | Faber | ..................... G16H 50/50 |
| 2018/0005372 | A1* | 1/2018 | Wang | ........................ G06T 7/66 |

FOREIGN PATENT DOCUMENTS

| | | |
|---|---|---|
| CN | 108537789 A | 9/2018 |
| CN | 110310323 A | 10/2019 |
| CN | 112288794 A | 1/2021 |

OTHER PUBLICATIONS

Materka, Andrzej, et al. "Automated modeling of tubular blood vessels in 3D MR angiography images." 2015 9th International Symposium on Image and Signal Processing and Analysis (ISPA). IEEE, 2015. (Year: 2015).*
(Continued)

*Primary Examiner* — Gregory A Morse
*Assistant Examiner* — Renae A Bitor
(74) *Attorney, Agent, or Firm* — AVEK IP, LLC

(57) ABSTRACT
Some embodiments of the disclosure provide a measuring method and measuring apparatus of a blood vessel diameter of a fundus image. In some examples, the measuring method include the following steps: acquiring a fundus image, generating a blood vessel segmentation image based on the fundus image, performing resolution enhancement on the blood vessel segmentation image, extracting blood vessel skeletons from the enhanced blood vessel segmentation image and performing fitting on the blood vessel skeletons to obtain a continuous blood vessel skeleton and a vessel diameter measurement direction of measurement pixel points, generating a blood vessel contour corresponding to
(Continued)

P2

P3 the measurement pixel points based on the enhanced blood vessel segmentation image, and calculating a blood vessel diameter corresponding to the measurement pixel points based on a number of blood vessel pixel points in the blood vessel contour.

16 Claims, 7 Drawing Sheets

(52) U.S. Cl.
CPC ............... *G06T 2207/20021* (2013.01); *G06T 2207/20081* (2013.01); *G06T 2207/20084* (2013.01); *G06T 2207/30041* (2013.01); *G06T 2207/30096* (2013.01); *G06T 2207/30101* (2013.01)

(58) Field of Classification Search
CPC . G06T 2207/20084; G06T 2207/30041; G06T 2207/30096; G06T 2207/30101; G06T 7/155; G06T 2207/20044; G06T 2207/30172; G06T 3/4053
See application file for complete search history.

(56) References Cited

OTHER PUBLICATIONS

Roychowdhury, Sohini, Dara D. Koozekanani, and Keshab K. Parhi. "Blood vessel segmentation of fundus images by major vessel extraction and subimage classification." IEEE journal of biomedical and health informatics 19.3 (2014): 1118-1128. (Year: 2014).*

Lowell, James, et al. "Measurement of retinal vessel widths from fundus images based on 2-D modeling." IEEE transactions on medical imaging 23.10 (2004): 1196-1204. (Year: 2004).*

Guedri, Hichem, et al. "Novel computerized method for measurement of retinal vessel diameters." Biomedicines 5.2 (2017): 12. (Year: 2017).*

International Search Report for PCT/CN2021/091223 by China National Intellectual Property Administration (CNIPA) issued on Jul. 30, 2021.

* cited by examiner start acquiring a fundus image ⟶ S210 performing blood vessel segmentation ⟶ S220 enhancing resolution ⟶ S230 acquiring a continuous blood vessel skeleton and a vessel diameter measurement direction ⟶ S240 generating a blood vessel contour ⟶ S250 calculating a blood vessel diameter ⟶ S260 end

P1

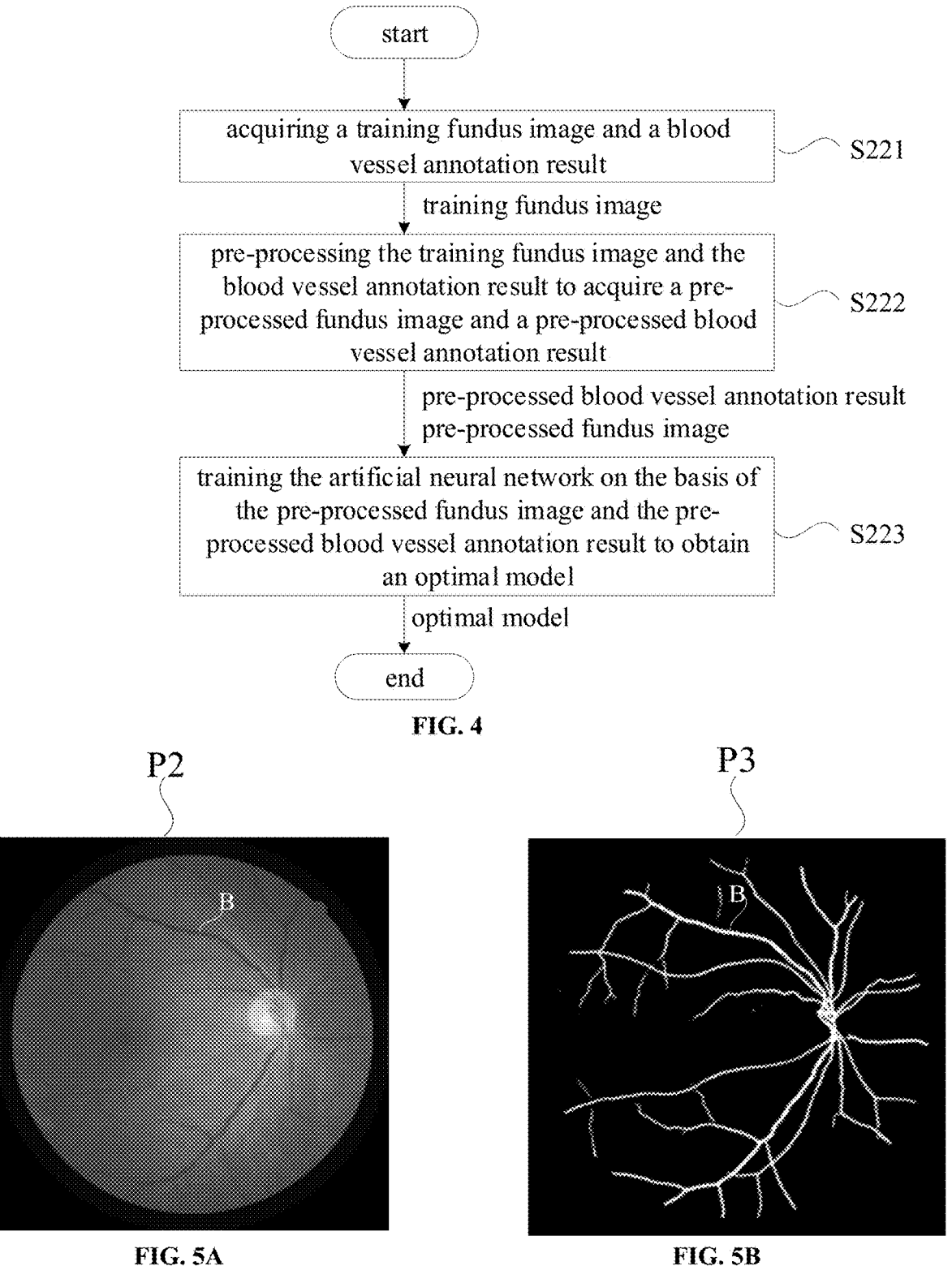

start acquiring a training fundus image and a blood vessel annotation result ⎯⎯ S221 training fundus image pre-processing the training fundus image and the blood vessel annotation result to acquire a pre-processed fundus image and a pre-processed blood vessel annotation result ⎯⎯ S222 pre-processed blood vessel annotation result
pre-processed fundus image training the artificial neural network on the basis of the pre-processed fundus image and the pre-processed blood vessel annotation result to obtain an optimal model ⎯⎯ S223 optimal model end

P6 start acquiring the width of the blood vessel contour ⟶ S251 acquiring an interpolation sampling interval ⟶ S252 generating interpolation points ⟶ S253 preforming an interpolation operation on the blood vessel segmentation image to determine a pixel value of the blood vessel contour ⟶ S254 generating the blood vessel contour on the basis of the pixel value of the blood vessel contour ⟶ S255 end

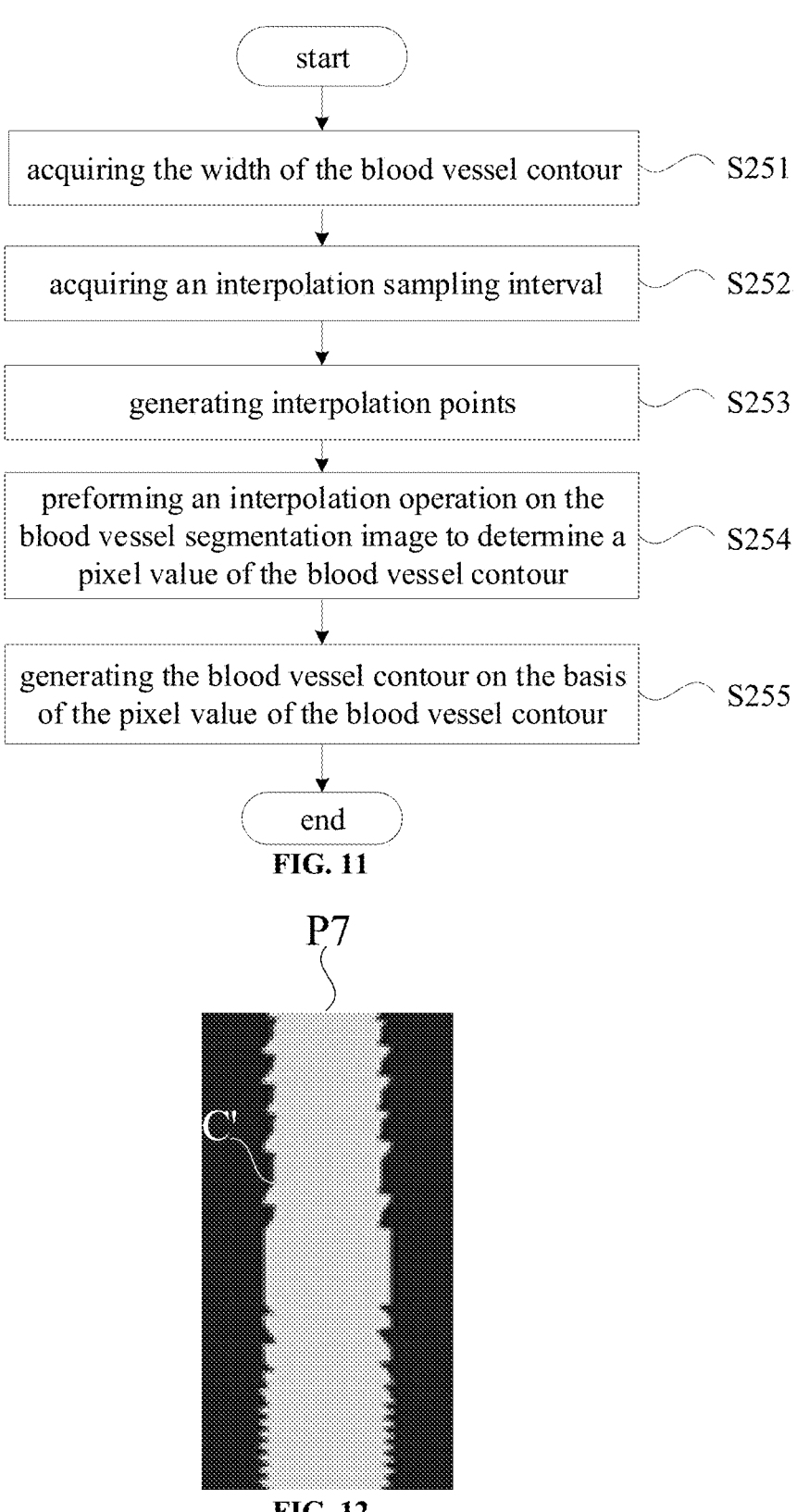

FIG. 12

MEASURING METHOD AND MEASURING APPARATUS OF BLOOD VESSEL DIAMETER OF FUNDUS IMAGE

CROSS REFERENCE TO RELATED APPLICATIONS

This application is the United State national stage entry under 37 U.S.C. 371 of PCT/CN2021/091223, filed on Apr. 29, 2021, which claims priority to Chinese application number 202010924287.2, filed on Sep. 4, 2020, the disclosure of which are incorporated by reference herein in their entireties.

FIELD OF THE DISCLOSURE

The disclosure relates generally to the field of measuring methods and measuring apparatuses. More specifically, the disclosure relates to measuring methods and measuring apparatuses of blood vessel diameters of fundus images.

BACKGROUND

Fundus lesions usually refer to ocular lesions caused by inflammation, tumor, or vascular lesions, etc. Fundus lesions may affect the eyesight of a patient and even result in loss of sight, and therefore, it is necessary to perform fundus examination regularly to find the fundus lesions early and perform treatment in time. The fundus lesions may be reflected by various physical signs. The variation of a blood vessel diameter in fundus is an important physical sign indicating the fundus lesions. Therefore, during fundus examination, the blood vessel diameter in the fundus is usually measured to obtain the variation of the blood vessel diameter in order to identify the fundus lesions.

Most of traditional measuring methods (such as a projection method and an ophthalmoscopic image measuring method) of a blood vessel diameter are used for measurement performed by a professional oculist by virtue of a measurement tool and based on experience, which are higher in measurement accuracy, but are longer in time consumption and incapable of achieving automatic processing in batches so as not to be beneficial to the recognition of the fundus lesions. Therefore, in the field of fundus image analysis, a measuring method which is high in accuracy and capable of automatically measuring a blood vessel diameter has been an important research content. Compared with a traditional vessel diameter measuring method, a fundus image has the advantages such as short acquisition time and low acquisition cost, and therefore, in recent years, more and more researchers perform automatic measurement on the blood vessel diameter by virtue of the fundus image. Particularly, with the development of a computer image processing technology, automatic measurement for the blood vessel diameter based on the fundus image has been widely researched. For example, researchers such as Gregson have performed automatic measurement on the blood vessel diameter by using a rectangular fitting method for a blood vessel gray contour curve; and researchers such as Peter have performed automatic measurement on the blood vessel diameter by using a method for searching a null point of a second derivative of a blood vessel gray contour curve. However, the measurement accuracy of the automatic measurement for the blood vessel diameter is still to be improved.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the present disclosure provides a measuring method of a blood vessel diameter of a fundus image, including: acquiring a fundus image including a blood vessel; generating a blood vessel segmentation image based on the fundus image; performing resolution enhancement on the blood vessel segmentation image according to a preset multiple to generate an enhanced blood vessel segmentation image; extracting blood vessel skeletons from the enhanced blood vessel segmentation image and performing fitting on the blood vessel skeletons to obtain a continuous blood vessel skeleton and a vessel diameter measurement direction of measurement pixel points, the measurement pixel points are a plurality of pixel points on the continuous blood vessel skeleton, and the vessel diameter measurement direction is perpendicular to a tangent line of the continuous blood vessel skeleton on the measurement pixel points; generating a blood vessel contour corresponding to the measurement pixel points, based on the enhanced blood vessel segmentation image, the measurement pixel points, the vessel diameter measurement direction of the measurement pixel points, and preset precision; and calculating a blood vessel diameter corresponding to the measurement pixel points based on the number of blood vessel pixel points in the blood vessel contour corresponding to the measurement pixel points, the preset multiple, and the preset precision.

In the present disclosure, the blood vessel segmentation image is enhanced to generate the enhanced blood vessel segmentation image, the blood vessel skeletons are extracted from the enhanced blood vessel segmentation image and are fitted to obtain the continuous blood vessel skeleton and the vessel diameter measurement direction of the measurement pixel points, the blood vessel contour corresponding to the measurement pixel points is generated based on the enhanced blood vessel segmentation image, the measurement pixel points, the vessel diameter measurement direction of the measurement pixel points, and the preset precision, and the blood vessel diameter corresponding to the measurement pixel points is calculated based on the number of the blood vessel pixel points in the blood vessel contour corresponding to the measurement pixel points, the preset multiple, and the preset precision. In this case, the resolution of a blood vessel in the fundus image may be increased, and then, the blood vessel diameter may be measured by using more pixel points. Therefore, automatic super-resolution measurement may be performed on the blood vessel diameter, and the measurement accuracy may be improved.

In addition, in the measuring method related to the first aspect of the present disclosure, optionally, an interpolation algorithm is used to perform an interpolation operation on the enhanced blood vessel segmentation image based on the enhanced blood vessel segmentation image, the measurement pixel points, the vessel diameter measurement direction of the measurement pixel points, and the preset precision to generate the blood vessel contour corresponding to the measurement pixel points. Therefore, the interpolation operation may be performed on the enhanced blood vessel segmentation image based on the preset precision to obtain the blood vessel contour.

In addition, in the measuring method related to the first aspect of the present disclosure, optionally, the blood vessel contour corresponding to each of the measurement pixel points is arranged in a central colinear manner side by side according to an arrangement order of the measurement pixel points on the continuous blood vessel skeleton to form a straightened blood vessel image. Therefore, the blood vessel contour corresponding to each of the measurement pixel points may be conveniently acquired.

In addition, in the measuring method related to the first aspect of the present disclosure, optionally, the blood vessel diameter l corresponding to the measurement pixel points is: l=n×s/e. Here, n is the number of the blood vessel pixel points in the blood vessel contour corresponding to the measurement pixel points, s is the preset precision, and e is the preset multiple. Therefore, the blood vessel diameter may be calculated.

In addition, in the measuring method related to the first aspect of the present disclosure, optionally, the preset multiple is an integer greater than 1, and the preset precision is a decimal greater than 0 and less than 1. Therefore, the resolution of a blood vessel in the fundus image may be enhanced, and then, the measurement accuracy of subsequent measurement for the blood vessel diameter may be improved.

In addition, in the measuring method related to the first aspect of the present disclosure, optionally, the width of the blood vessel contour is N times as large as the maximum blood vessel diameter. Here, N is an integer ranging from 2 to 5. Therefore, the widest blood vessel in the enhanced blood vessel segmentation image may be completely presented in the blood vessel contour.

In addition, in the measuring method related to the first aspect of the present disclosure, optionally, the interpolation algorithm is a cubic spline interpolation algorithm. Therefore, the interpolation operation may be performed on the enhanced blood vessel segmentation image by using the cubic spline interpolation algorithm.

In addition, in the measuring method related to the first aspect of the present disclosure, optionally, the number n of the blood vessel pixel points in the blood vessel contour corresponding to the measurement pixel points is calculated according to the following formula: n=card({p:p∈P, f(p)>T}). Here, p is the measurement pixel points, f(p) is pixel values corresponding to the measurement pixel points p, T is a preset threshold parameter, P is a pixel point set in the blood vessel contour corresponding to the measurement pixel points p, and card represents a cardinality of the set. Therefore, the number of the blood vessel pixel points in the blood vessel contour corresponding to the measurement pixel points may be calculated.

In other embodiments, the present disclosure provides an measuring apparatus of a blood vessel diameter of a fundus image, including: an acquisition unit configured to acquire a fundus image including a blood vessel; a segmentation unit configured to generate a blood vessel segmentation image based on the fundus image; an enhancement unit configured to perform resolution enhancement on the blood vessel segmentation image according to a preset multiple to generate an enhanced blood vessel segmentation image; an extraction unit configured to extract blood vessel skeletons from the enhanced blood vessel segmentation image and performing fitting on the blood vessel skeletons to obtain a continuous blood vessel skeleton and a vessel diameter measurement direction of measurement pixel points. The measurement pixel points are a plurality of pixel points on the continuous blood vessel skeleton, and the vessel diameter measurement direction is perpendicular to a tangent line of the continuous blood vessel skeleton on the measurement pixel points; a generation unit configured to generate a blood vessel contour corresponding to the measurement pixel points based on the enhanced blood vessel segmentation image, the measurement pixel points, the vessel diameter measurement direction of the measurement pixel points, and preset precision; and a calculation unit configured to calculate a blood vessel diameter corresponding to the measurement pixel points based on the number of blood vessel pixel points in the blood vessel contour corresponding to the measurement pixel points, the preset multiple, and the preset precision.

In the present disclosure, the enhancement unit performs enhancement on the blood vessel segmentation image generated by the segmentation unit to generate the enhanced blood vessel segmentation image, the extraction unit extracts the continuous blood vessel skeleton and the vessel diameter measurement direction of the measurement pixel points, the generation unit generates, based on the enhanced blood vessel segmentation image, the measurement pixel points, the vessel diameter measurement direction of the measurement pixel points, and the preset precision, the blood vessel contour corresponding to the measurement pixel points, and the calculation unit calculates, based on the number of the blood vessel pixel points in the blood vessel contour corresponding to the measurement pixel points, the preset multiple, and the preset precision, the blood vessel diameter corresponding to the measurement pixel points. In this case, the resolution of a blood vessel in the fundus image may be increased, and then, the blood vessel diameter may be measured by using more pixel points. Therefore, automatic super-resolution measurement may be performed on the blood vessel diameter, and the measurement accuracy may be improved.

In addition, in the measuring apparatus related to the second aspect of the present disclosure, optionally, an interpolation algorithm is used to perform an interpolation operation on the enhanced blood vessel segmentation image based on the enhanced blood vessel segmentation image, the measurement pixel points, the vessel diameter measurement direction of the measurement pixel points, and the preset precision to generate the blood vessel contour corresponding to the measurement pixel points. Therefore, the interpolation operation may be performed on the enhanced blood vessel segmentation image based on the preset precision to obtain the blood vessel contour.

In addition, in the measuring apparatus related to the second aspect of the present disclosure, optionally, the blood vessel diameter l corresponding to the measurement pixel points is l=n×s/e. Here, n is the number of the blood vessel pixel points in the blood vessel contour corresponding to the measurement pixel points, s is the preset precision, and e is the preset multiple. Therefore, the blood vessel diameter may be calculated.

BRIEF DESCRIPTION OF THE DRAWINGS

Illustrative embodiments of the present disclosure are described in detail below with reference to the attached drawing figures.

FIG. 4 is a flow chart showing a training method for blood vessel segmentation based on an artificial neural network according to an embodiment of the disclosure.

FIG. 5A is a schematic diagram showing a training fundus image according to an embodiment of the disclosure.

FIG. 5B is a schematic diagram showing a blood vessel annotation result according to an embodiment of the disclosure.

FIG. 11 is a flow chart showing a generation of a blood vessel contour according to an embodiment of the disclosure.

FIG. 12 is a schematic diagram showing a straightened blood vessel image according to an embodiment of the disclosure.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
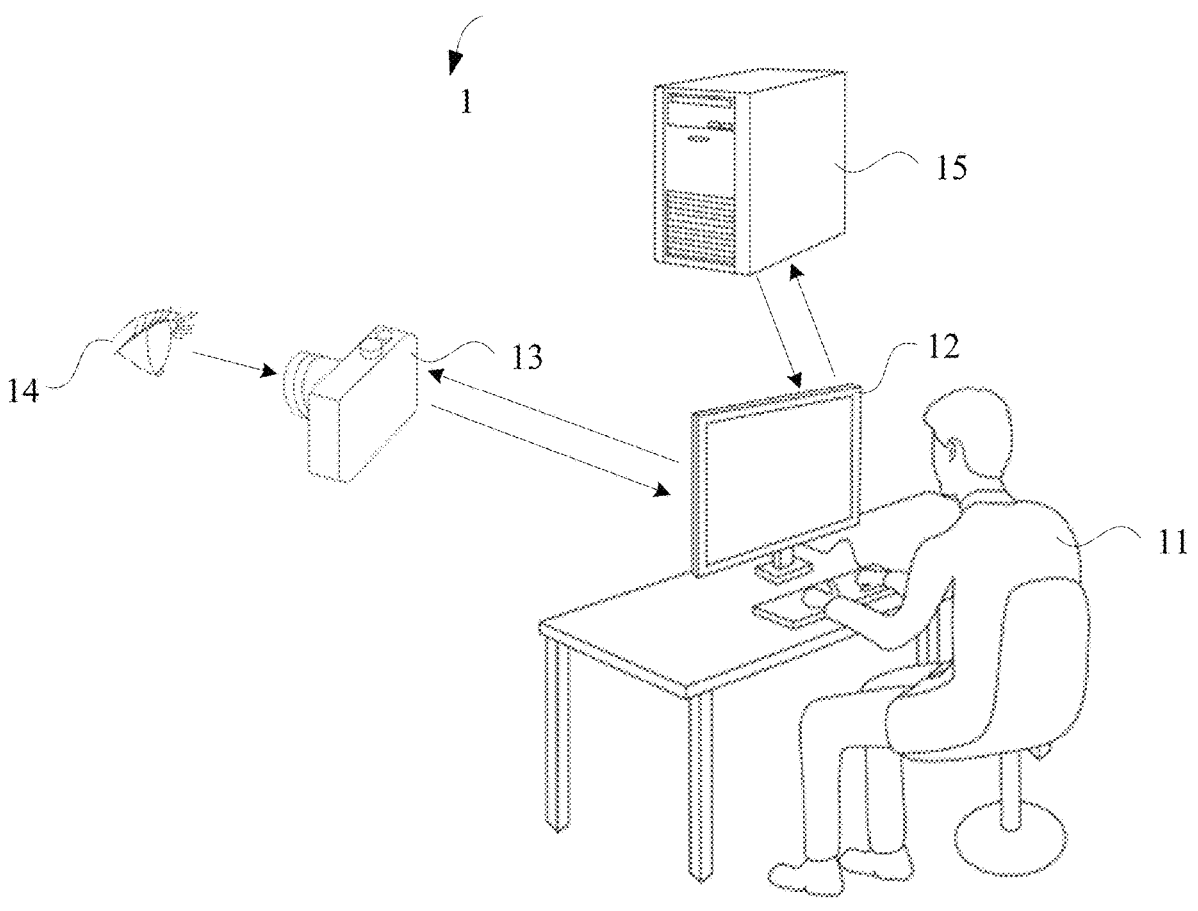
FIG. 1 is a schematic diagram showing an application scenario of a measuring method of a blood vessel diameter of a fundus image according to an embodiment of the disclosure.

FIG. 1 is a schematic diagram showing an application scenario of a measuring method of the blood vessel diameter of the fundus image according to an embodiment of the disclosure.

In some examples, a measuring method (sometimes, referred to as a measuring method for short) of a blood vessel diameter of a fundus image related to the present disclosure may be applied to an application scenario 1 as shown in FIG. 1. In the application scenario 1, an operator 11 may control an acquisition device 13 connected to a terminal 12 to acquire a fundus image of a human eye 14. After the acquisition device 13 completes the acquisition of the fundus image, the terminal 12 may submit the fundus image to a server 15 by virtue of a computer network. The server 15 may obtain a blood vessel diameter in the fundus image by performing the measuring method according to an embodiment of the disclosure and return the blood vessel diameter to the terminal 12. In some examples, the terminal 12 may display the blood vessel diameter. In some other examples, the blood vessel diameter may be used as an intermediate result to be stored in the terminal 12 or a memory of the server 15.

In some examples, the operator 11 may be a physician having professional knowledge for the measurement of the blood vessel diameter of the fundus image. In some other examples, the operator 11 may be an ordinary person skilled in operating the terminal 12 to automatically measure the blood vessel diameter.

In some examples, the terminal 12 may include, but is not limited to a notebook computer, a tablet personal computer, or a desktop computer. In some examples, the terminal 12 may be a dedicated device including a processor, a memory, a display screen, and the acquisition device 13, and configured to measure a blood vessel diameter.

In some examples, the acquisition device 13 may include, but is not limited to a camera. The camera may be a color fundus camera, for example. The acquisition device 13 may be connected with the terminal 12 by a serial port or integrated in the terminal 12.

In some examples, the fundus of the human eye 14 refers to tissues at the rear inside an eyeball and may include intima, retina, macula lutea, and blood vessels (retinal arteries and veins) of the eyeball. In some examples, fundus lesions may be recognized by monitoring the variation of a blood vessel diameter.

In some examples, the server 15 may include one or more processors and one or more memories. The processor may include a central processing unit, a graphics processing unit, and any other electronic components capable of processing data, and may execute a computer program instruction. The memory may be configured to store the computer program instruction. In some examples, the measuring method may be stored in the memory in a form of the computer program instruction and executed by the server 15. In some examples, the server 15 may also be a cloud server.

Figures 2, 3:
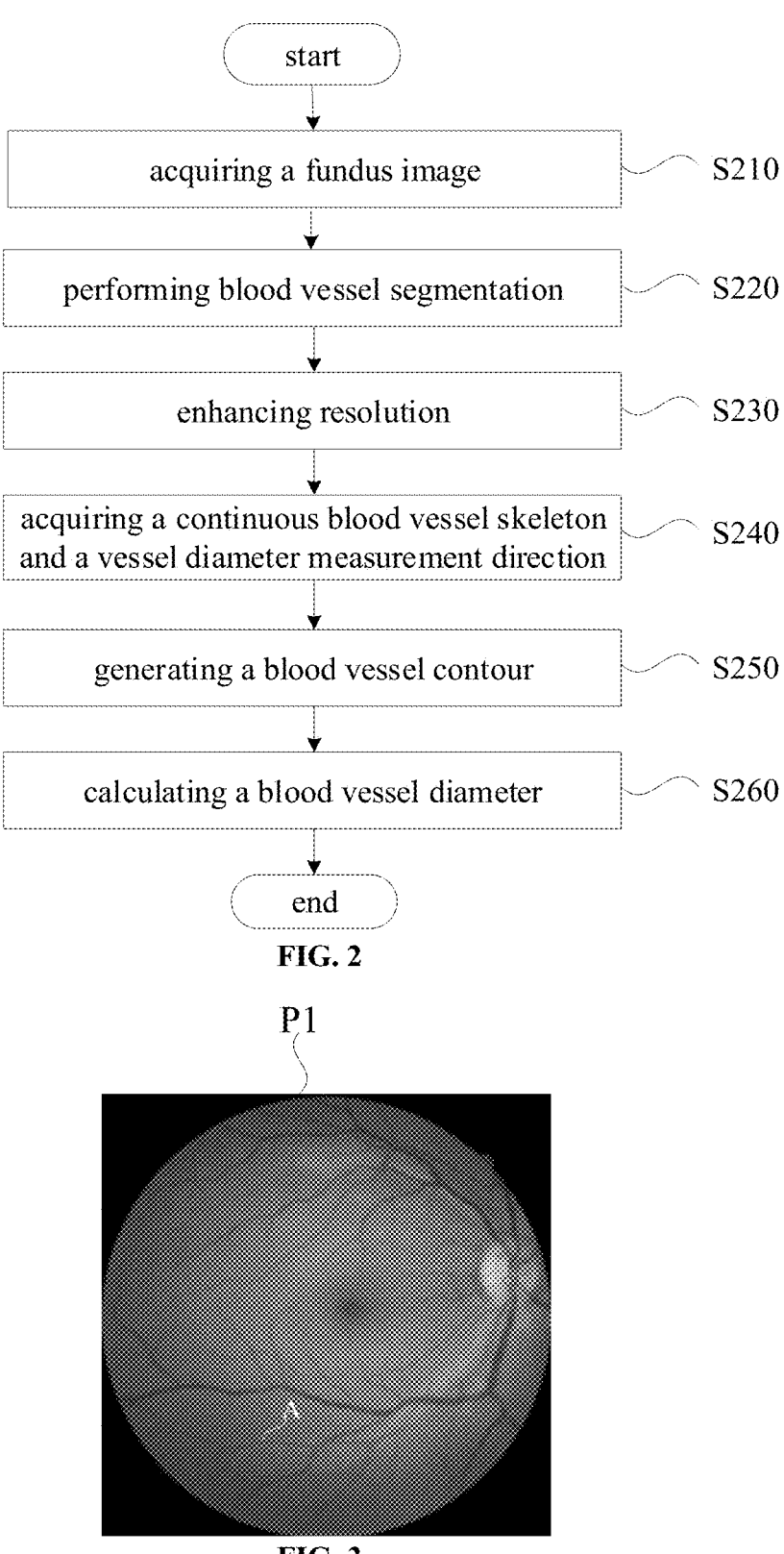
FIG. 2 is a flow chart showing a measuring method of a blood vessel diameter of a fundus image according to an embodiment of the disclosure.
FIG. 3 is a schematic diagram showing a fundus image according to an embodiment of the disclosure.

As mentioned above, the server 15 may obtain the blood vessel diameter in the fundus image by performing the measuring method related to the example of the present disclosure. FIG. 2 is a flow chart showing the measuring method of the blood vessel diameter of the fundus image according to an embodiment of the disclosure. FIG. 3 is a schematic view showing a fundus image according to an embodiment of the disclosure. A fundus image P1 is photographed by a fundus camera.

In some examples, as shown in FIG. 2, the measuring method of the blood vessel diameter of the fundus image according to an embodiment of the disclosure may include: acquiring a fundus image (step S210); performing blood vessel segmentation (step S220); enhancing a resolution (step S230); acquiring a continuous blood vessel skeleton and a vessel diameter measurement direction (step S240); generating a blood vessel contour (step S250); and calculating a blood vessel diameter (step S260). In this case, the resolution of a blood vessel in the fundus image may be increased, and then, the blood vessel diameter may be measured by using more pixel points. Therefore, automatic super-resolution measurement may be performed on the blood vessel diameter, and the measurement accuracy may be improved.

Generally, the measured width (i.e., the number of the pixel points) of the blood vessel diameter in the fundus image is a positive integer, for example, the measured width may be 1, 3, 6, or 8 and the like. A super-resolution technology based on resolution enhancement and preset precision may be configured to perform sub-pixel-level measurement for the blood vessel diameter, and thus, the measured width may be a decimal, for example, the measured width may be 1.23, 3.12, 5.63, or 7.56 and the like. Therefore, the blood vessel diameter may be measured more accurately.

In the step S210, the fundus image may be acquired. The fundus image may include a blood vessel. In some examples, the fundus image may be a color fundus image. The color fundus image may clearly reflect fundus information such as intima, retina, macula lutea, and blood vessels (retinal arteries and veins) of an eyeball. In other examples, the fundus image may be a gray image. In some examples, the fundus image may be acquired by the acquisition device 13. As an example of the fundus image, a fundus image P1 photographed by a fundus camera is shown in FIG. 3. The fundus image P1 may include a blood vessel A. In other examples, the fundus image may be an image prestored in the terminal 12 or server 15.

In some examples, in the step S210, the fundus image may be pre-processed. Generally, there may be issues such as different image formats and sizes in the fundus image, and therefore, it may be necessary, in some examples, to pre-process the fundus image to convert the fundus image into an image in a fixed standard form. The fixed standard form may refer to the same image format and consistent size. For example, in some examples, the pre-processed fundus image may have the pixels of which the unified widths are 512 or 1024.

In the step S220, blood vessel segmentation may be performed on the fundus image acquired in the step S210. In some examples, a blood vessel segmentation image may be generated based on the fundus image. As mentioned above, the fundus may include the intima, the retina, the macula lutea, and the blood vessels (retinal arteries and veins) of the eyeball. Therefore, the fundus image of the fundus may include patterns of the intima, the retina, the macula lutea, and the blood vessels (retinal arteries and veins) of the eyeball, a blood vessel area may be recognized by performing blood vessel segmentation on the fundus image, and thus, influences from other structures outside the blood vessels are eliminated.

Generally, a blood vessel segmentation method may be divided into an unsupervised learning method and a supervised learning method. For the unsupervised learning method, the fundus image may be pre-processed firstly by using an image processing technology, and then, segmentation is performed on the pre-processed fundus image by using a threshold method.

In some examples, for the supervised learning method, features of the fundus image may be extracted in a manual or automatic manner according to the fundus image and a blood vessel annotation result thereof to train a classifier, and resulting in realizing blood vessel segmentation on the fundus image. For example, blood vessel segmentation may be performed on the fundus image by an optimal model obtained by training an artificial neural network.

A training method for blood vessel segmentation based on an artificial neural network will be described in detail below with reference to the accompanying drawings. FIG. 4 is a flow chart showing a training method for blood vessel segmentation based on an artificial neural network according to an embodiment of the disclosure. FIG. 5A is a schematic view showing a training fundus image according to an embodiment of the disclosure. FIG. 5B is a schematic view showing a blood vessel annotation result according to an embodiment of the disclosure.

As shown in FIG. 4, the training method for blood vessel segmentation may include: acquiring a training fundus image and a blood vessel annotation result (step S221); pre-processing the training fundus image and the blood vessel annotation result to acquire a pre-processed fundus image and a pre-processed blood vessel annotation result (step S222); and training the artificial neural network based on the pre-processed fundus image and the pre-processed blood vessel annotation result to obtain an optimal model (step S223). In this case, based on the artificial neural network, features of a blood vessel may be automatically learned, and a blood vessel segmentation result may be output.

In the step S221, the training fundus image and the blood vessel annotation result may be acquired. The training fundus image in the step S221 may be a fundus image obtained by shooting a fundus. As an example of the training fundus image, a training fundus image P2 is shown in FIG. 5A. The training fundus image P2 may include a blood vessel B. In some examples, training fundus images may be a plurality of prestored fundus images. In some examples, the plurality of prestored fundus images may form a training data set.

Generally, for an artificial neural network for supervised learning, a loss function needs to be calculated based on the blood vessel annotation result as a true value. Therefore, the training fundus image needs to be annotated to acquire the blood vessel annotation result of the training fundus image. The blood vessel annotation result may include a blood vessel. In some examples, the training fundus image may be annotated by an experienced physician by using an annotating tool to generate the blood vessel annotation result. As an example of the blood vessel annotation result, a blood vessel annotation result P3 generated after the training fundus image P2 is annotated is shown in FIG. 5B. The blood vessel annotation result P3 may include the blood vessel B.

In the step S222, the training fundus image and the blood vessel annotation result may be pre-processed to acquire the pre-processed fundus image and the pre-processed blood vessel annotation result. In some examples, the training fundus image may be pre-processed to generate the pre-processed fundus image. In some examples, the pre-processing for the training fundus image may include cutting, denoising, graying and the like performed on the training fundus image. Therefore, the blood vessel in the training fundus image may be highlighted. In some examples, operations such as rotation, scaling, and translation may be performed on the training fundus image. Therefore, the data volume for training the artificial neural network may be increased. In some examples, the blood vessel annotation result may be pre-processed to generate the pre-processed blood vessel annotation result. In some examples, the manner for pre-processing the blood vessel annotation result may be the same as the manner for pre-processing the training fundus image.

In the step S223, the artificial neural network may be trained based on the pre-processed fundus image and the pre-processed blood vessel annotation result to acquire the optimal model. In some examples, the artificial neural network may be trained based on the pre-processed fundus image and the pre-processed blood vessel annotation result to acquire the optimal model. In some examples, the pre-processed blood vessel annotation result may be used as a true value to calculate the loss function, and the artificial neural network is continuously optimized according to the loss function until the value (namely loss) of the loss function is converged to be optimal.

In some examples, the artificial neural network may be a U-Net. Specifically, the U-Net is an artificial neural network for semantic segmentation of an image and may include a feature extraction part and an up-sampling part. The feature extraction part may include a plurality of encoding layers, and an input of a first encoding layer is the training fundus image. In some examples, the encoding layers may include a series of convolutional layers, batch normalization layers, activation layers, and pooling layers. The up-sampling part may include a plurality of decoding layers. The last decoding layer (i.e., an output layer) is configured to output the probability that each of pixel points in the training fundus image belongs to a blood vessel. In this case, the blood vessel segmentation image may be generated based on the probability that each of pixel points in the training fundus image belongs to a blood vessel.

Figure 6:
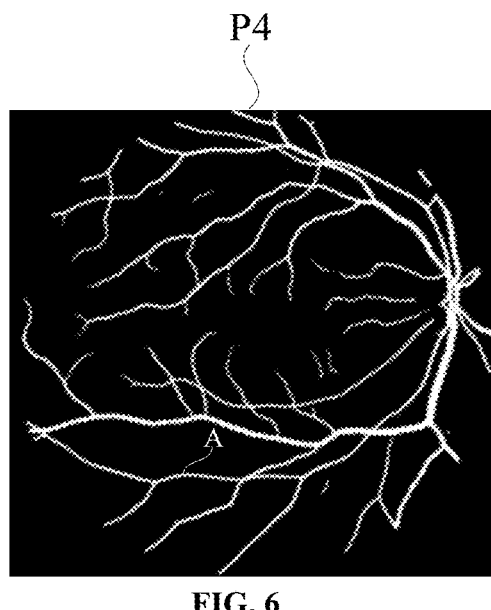
FIG. 6 is a schematic diagram showing a blood vessel segmentation image according to an embodiment of the disclosure.

FIG. 6 is a schematic diagram showing a blood vessel segmentation image according to an embodiment of the disclosure.

As mentioned above, the artificial neural network may generate the blood vessel segmentation image based on the probability that each of pixel points in the training fundus image belongs to a blood vessel. Therefore, the optimal model obtained by training the artificial neural network is also capable of performing blood vessel segmentation on the fundus image to generate the blood vessel segmentation image. In some examples, the fundus image acquired in the step S210 may be input to the optimal model, so that blood vessel segmentation is performed on the fundus image, and then, the blood vessel segmentation image is generated. In some examples, the blood vessel segmentation image may be a binary image, that is, two colors, i.e., only black and white are included. As an example of the blood vessel segmentation image, a blood vessel segmentation image P4 generated by performing blood vessel segmentation on the fundus image P1 is shown in FIG. 6. The blood vessel segmentation image P4 may include the blood vessel A.

As mentioned above, the measuring method may include the step S230. In step S230, resolution enhancement may be performed on the blood vessel segmentation image acquired in the step S220. In some examples, resolution enhancement may be performed on the blood vessel segmentation image according to a preset multiple to generate an enhanced blood vessel segmentation image. For example, in some examples, 10-time resolution enhancement may be performed on a blood vessel segmentation image of which the resolution is 140×63 to generate an enhanced blood vessel segmentation image of which the resolution is 1400×630.

In addition, in some examples, resolution enhancement may be performed on the blood vessel segmentation image by using a linear interpolation method. However, examples of the present disclosure are not limited thereto, in other examples, resolution enhancement may be performed on the blood vessel segmentation image by using an image super-resolution method based on deep learning.

In addition, in some examples, the preset multiple may be an integer greater than 1. Therefore, the resolution of a blood vessel in the fundus image may be increased, and then, the measurement accuracy of subsequent measurement for the blood vessel diameter may be improved. In some examples, the preset multiple may range from 5 to 15. For example, the preset multiple may be 5, 10, or 15 and the like.

Figure 7:
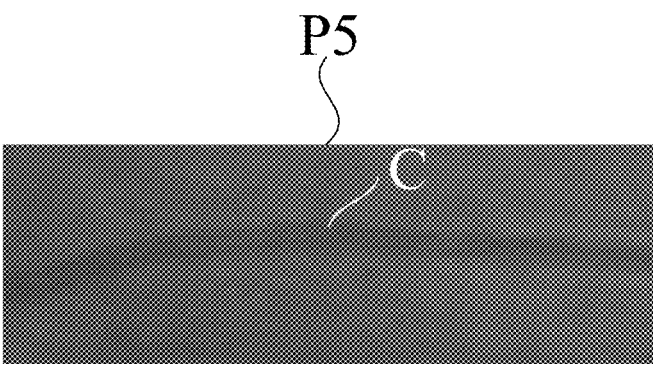
FIG. 7 is a schematic diagram showing a local fundus image according to an embodiment of the disclosure.
Figure 8:
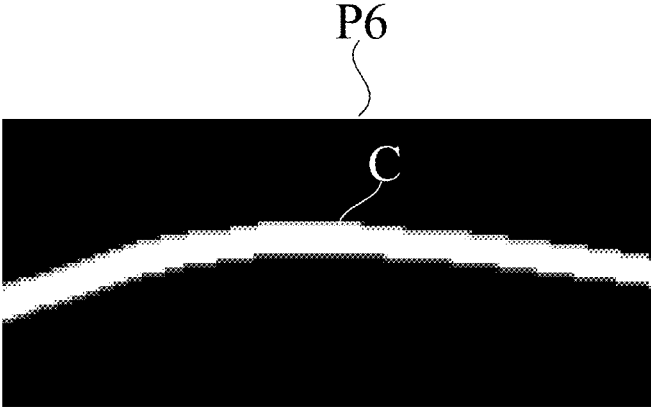
FIG. 8 is a schematic diagram showing a local blood vessel segmentation image according to an embodiment of the disclosure.
Figures 9, 10:
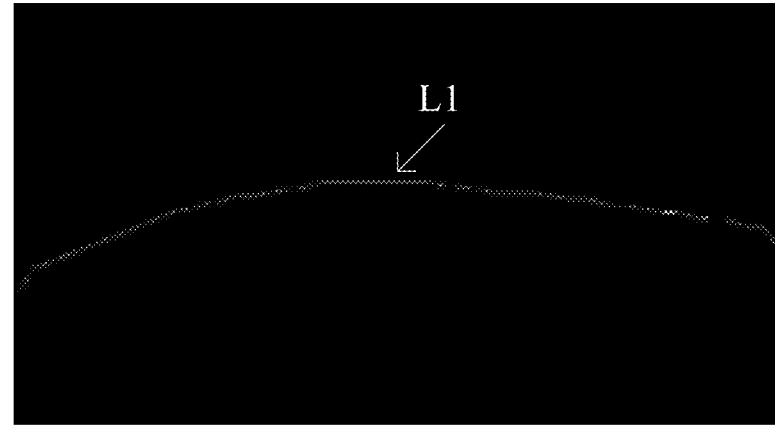
FIG. 9 is a schematic diagram showing a local blood vessel skeleton according to an embodiment of the disclosure.
FIG. 10 is a schematic diagram showing a vessel diameter measurement direction according to an embodiment of the disclosure.

FIG. 7 is a schematic diagram showing a local fundus image according to an embodiment of the disclosure, a local fundus image P5 is a local image of the fundus image P1 and may include a local blood vessel C. FIG. 8 is a schematic diagram showing a local blood vessel segmentation image according to an embodiment of the disclosure. A local blood vessel segmentation image P6 may be a local image corresponding to the local fundus image P5 in the blood vessel segmentation image P4 and may include the local blood vessel C. FIG. 9 is a schematic diagram showing a local blood vessel skeleton according to an embodiment of the disclosure.

In the step S240, the continuous blood vessel skeleton and the vessel diameter measurement direction may be acquired.

In some examples, after the enhanced blood vessel segmentation image generated in the step S230 is acquired, blood vessel skeletons in the enhanced blood vessel segmentation image may be extracted. The blood vessel skeletons may be center lines of blood vessels. As an example of the blood vessel skeletons, the local blood vessel segmentation image P6 as shown in FIG. 8 is enhanced to extract blood vessel skeletons of the local blood vessel C. FIG. 9 shows a local blood vessel skeleton L1 of the local blood vessel C corresponding to the enhanced local blood vessel segmentation image P6, and it may be seen from FIG. 9 that the local blood vessel skeleton L1 consists of discrete pixel points.

In some examples, the enhanced blood vessel segmentation image may be thinned by employing a morphological thinning algorithm to extract the blood vessel skeletons. That is, blood vessel width in the enhanced blood vessel segmentation image is thinned in the direction of the center of a blood vessel to form the width of a pixel to form the blood vessel skeletons, and a basic topological structure shaped like a blood vessel in the enhanced blood vessel segmentation image is kept unchanged. In some examples, the morphological thinning algorithm may include, but is not limited to a Hilditch thinning algorithm, a Pavlidis thinning algorithm, or a Rosenfeld thinning algorithm. In some examples, before the blood vessel skeletons are extracted from the enhanced blood vessel segmentation image, median filtering operation may be performed on the enhanced blood vessel segmentation image. Therefore, bifurcation possibly occurring on tail ends of the blood vessel skeletons may be eliminated.

As mentioned above, the blood vessel skeletons may consist of discrete pixel points. Therefore, in some examples, the blood vessel skeletons may be fitted to acquire a continuous blood vessel skeleton. In some examples, the blood vessel skeletons may be fitted by using a least square cubic spline interpolation algorithm. Therefore, the continuous blood vessel skeleton and a fitting equation may be obtained.

FIG. 10 is a schematic diagram showing a vessel diameter measurement direction according to an embodiment of the disclosure.

In addition, in some examples, in the step S240, the vessel diameter measurement direction of measurement pixel points may be acquired. The measurement pixel points may be a plurality of pixel points on the continuous blood vessel skeleton. In some examples, the vessel diameter measurement direction may be perpendicular to a tangent line of the continuous blood vessel skeleton on the measurement pixel points. In some examples, the tangent line of the measurement pixel points may be acquired by a first derivative of the above-mentioned fitting equation. As shown in FIG. 10, a tangent line of a continuous blood vessel skeleton L2 of the local blood vessel C on measurement pixel points D1 may be a tangent line L3. A straight line passing through the measurement pixel points D1 and perpendicular to the tangent line L3 may be a vessel diameter measurement direction L4. In the step S250, the blood vessel contour may be generated. In some examples, the blood vessel contour corresponding to the measurement pixel points may be generated based on the enhanced blood vessel segmentation image acquired in the step S230, the measurement pixel points acquired in the step S240, the vessel diameter measurement direction of the measurement pixel points acquired in the step S240, and preset precision.

In some examples, an interpolation algorithm may be used to do an interpolation operation on the enhanced blood vessel segmentation image based on the enhanced blood vessel segmentation image, the measurement pixel points, the vessel diameter measurement direction of the measurement pixel points, and the preset precision to generate the blood vessel contour corresponding to the measurement pixel points. Therefore, the interpolation operation may be performed on the enhanced blood vessel image based on the preset precision to obtain the blood vessel contour. In some examples, the interpolation algorithm may be a cubic spline interpolation algorithm. Therefore, the interpolation operation may be performed on the enhanced blood vessel segmentation image by using the cubic spline interpolation algorithm.

In addition, in some examples, the preset precision may be a decimal greater than 0 and less than 1. Therefore, the resolution of a blood vessel in the fundus image may be increased, and then, the measurement accuracy of subsequent measurement for the blood vessel diameter may be improved. In some examples, the preset precision may range from 0.01 to 1.10. For example, the preset precision may be 0.01, 0.05, or 0.10 and the like. Hereinafter, the process for generating the blood vessel contour will be described in detail with reference to the accompanying drawings. FIG. 11 is a flow chart showing the generation of a blood vessel contour according to an embodiment of the disclosure.

As shown in FIG. 11, the process for generating the blood vessel contour in the step S250 may include: acquiring the width of the blood vessel contour (step S251); acquiring an interpolation sampling interval (step S252); generating interpolation points (step S253); performing an interpolation operation on the blood vessel segmentation image to determine a pixel value of the blood vessel contour (step S254); and generating the blood vessel contour based on the pixel value of the blood vessel contour (step S255).

In step S251, the width of the blood vessel contour may be acquired. In some examples, the width of the blood vessel contour may be N times as large as the maximum blood vessel diameter. N may be an integer ranging from 2 to 5. In some examples, the width of the blood vessel contour may be 2 times as large as the maximum blood vessel diameter. In some examples, the maximum blood vessel diameter may be a predicted maximum blood vessel diameter. Therefore, the widest blood vessel in the enhanced blood vessel segmentation image may be completely presented in the blood vessel contour.

In some examples, the predicted maximum blood vessel diameter may be 2 times as large as the maximum distance in distances from pixel points in the continuous blood vessel skeleton to non-blood vessel pixels closest to the pixel points. The distances may be Euclidean distances. Specifically, the Euclidean distances from all of the pixel points in the continuous blood vessel skeleton to the non-blood vessel pixels closest to the pixel points are calculated, and two times of the maximum Euclidean distance are selected as the predicted maximum blood vessel diameter. Therefore, the maximum blood vessel diameter may be roughly estimated. However, examples of the present disclosure are not limited thereto. In other examples, the maximum blood vessel diameter may be estimated in other manners.

In step S252, the interpolation sampling interval may be acquired. In some examples, the interpolation sampling interval may be acquired based on the width of the blood vessel contour and the preset precision. Specifically, assuming that the width of the blood vessel contour may be denoted by wi and the preset precision may be denoted by s, a value of the interpolation sampling interval may range from $-(wi-1)/2$ to $(wi-1)/2$, and the preset precision s serves as a step length increasing value. For example, the value of the interpolation sampling interval may be $-(wi-1)/2$, $(wi-1)/2+s$, $(wi-1)/2+2\times s$ or $(wi-1)/2$ and the like.

In the step S253, the interpolation points may be generated. In some examples, the interpolation points may be generated based on the interpolation sampling interval acquired in the step S252, the vessel diameter measurement direction and the continuous blood vessel skeleton. Specifically, assuming that the interpolation sampling interval is denoted by inc, the vessel diameter measurement direction may be denoted by (dx, dy), and the continuous blood vessel skeleton may be denoted by (x, y), the interpolation points may be denoted by $(x+dx\times inc, y+dy\times inc)$. In this case, the generated interpolation points are distributed in the vessel diameter measurement direction. Therefore, the number of the pixel points near the vessel diameter measurement direction may be increased, and then, the measurement accuracy of the blood vessel diameter may be improved.

In the step S254, the interpolation operation may be performed on the blood vessel segmentation image to determine the pixel value of the blood vessel contour. In some examples, an interpolation algorithm may be used to perform the interpolation operation on the blood vessel segmentation image based on the interpolation points acquired in the step S253 to determine the pixel value of the blood vessel contour. In some examples, the interpolation algorithm may be a cubic spline interpolation algorithm. Therefore, the interpolation operation may be performed on the enhanced blood vessel segmentation image by using the cubic spline interpolation algorithm.

FIG. 12 is a schematic diagram showing a straightened blood vessel image according to an embodiment of the disclosure.

In step S255, the blood vessel contour may be generated based on the pixel value of the blood vessel contour. In some examples, the blood vessel contour corresponding to each of the measurement pixel points may be output based on the pixel value of the blood vessel contour. In some examples, the blood vessel contour corresponding to each of the measurement pixel points may be arranged in a central colinear manner side by side according to an arrangement order of the measurement pixel points on the continuous blood vessel skeleton to form a straightened blood vessel image. As an example of the straightened blood vessel image, a straightened blood vessel image P7 is shown in FIG. 12. The straightened blood vessel image P7 may include a straightened local blood vessel C' corresponding to a local blood vessel C. Therefore, the blood vessel contour corresponding to each of the measurement pixel points may be conveniently acquired.

As mentioned above, the measuring method may include a step S260. In step S260, the blood vessel diameter may be calculated. In some examples, the blood vessel diameter corresponding to the measurement pixel points may be calculated based on the number of the blood vessel pixel points in the blood vessel contour corresponding to the measurement pixel points, the preset multiple, and the preset precision. The blood vessel diameter corresponding to the measurement pixel points may be acquired in the step S250.

In some examples, the number n of the blood vessel pixel points in the blood vessel contour corresponding to the measurement pixel points may be calculated according to the following formula:

$$n=\mathrm{card}(\{p{:}p{\in}P,f(p){>}T\}).$$

Here, p is the measurement pixel point, f(p) is pixel value corresponding to the measurement pixel point p, T is a preset threshold parameter, P is a pixel point set in the blood vessel contour corresponding to the measurement pixel point p, and card represents a cardinality of the set. Therefore, the number of the blood vessel pixel points in the blood vessel contour corresponding to the measurement pixel points may be calculated. In some examples, T may be 0.9. Therefore, the blood vessel pixel points and non-blood vessel pixel points in the blood vessel contour corresponding to the measurement pixel points may be distinguished.

In some examples, the blood vessel diameter l corresponding to the measurement pixel points may be:

$$l=n{\times}s/e.$$

Here, n is the number of the blood vessel pixel points in the blood vessel contour corresponding to the measurement pixel points, s is the preset precision, and e is the preset multiple. Therefore, the blood vessel diameter may be calculated.

As mentioned above, the preset multiple may be an integer greater than 1. The preset precision may be a decimal greater than 0 and less than 1. In some examples, the blood vessel diameter of the same segment of blood vessel may be measured according to a different preset multiple e and different preset precision s to obtain a more accurate measurement result of the blood vessel diameter.

Hereinafter, with the local blood vessel C in the local fundus image P5 as shown in FIG. 7 as an example, a blood vessel diameter measurement result of the local blood vessel C based on the different preset multiple e and the different preset precision s is compared with a manually labeled blood vessel diameter measurement result of the local blood vessel C, and a comparison result may refer to Table 1. The mean value is an average value of the blood vessel diameter of the local blood vessel C, and the standard deviation is a standard deviation of the blood vessel diameter of the local blood vessel C.

TABLE 1

| Parts of comparison results of blood vessel diameter measurement results | | |
|---|---|---|
| Measurement parameter | Mean value | Standard deviation |
| Manually annotated | 6.4094 | 0.421 |
| e = 1, s = 1 | 5.9365 | 0.7319 |
| e = 5, s = 0.5 | 6.4457 | 0.4737 |
| e = 5, s = 0.1 | 6.435 | 0.4723 |
| e = 5, s = 0.05 | 6.4341 | 0.4707 |
| e = 5, s = 0.01 | 6.4345 | 0.471 |
| e = 10, s = 0.5 | 6.5142 | 0.4799 |
| e = 10, s = 0.1 | 6.5078 | 0.4791 |
| e = 10, s = 0.05 | 6.5069 | 0.4787 |
| e = 10, s = 0.01 | 6.507 | 0.4788 |
| e = 15, s = 0.5 | 6.5341 | 0.4757 |
| e = 15, s = 0.1 | 6.5293 | 0.4757 |
| e = 15, s = 0.05 | 6.5288 | 0.4754 |
| e = 15, s = 0.01 | 6.5289 | 0.4755 |

Seen from the comparison table 1 of the blood vessel diameter measurement results, for the local blood vessel C, the mean value and standard deviation of the manually labeled blood vessel diameter are respectively 6.4094 and 0.421. When a super-resolution technology (that is, e=1, s=1) is not used, the mean value and standard deviation of the measured blood vessel diameter in the present disclosure are respectively 5.9365 and 0.7319 which greatly differ from the manually annotated results. When the super-resolution technology (that is, e∈{5,10,15} and s∈{0.01,0.05,0.1,0.5}) is used, the mean value and the standard deviation of vessel diameter measurement are both close to the manually annotated results. Particularly, when e=5, and s=0.05, the mean value and standard deviation of the blood vessel diameter are respectively 6.4341 and which are equivalent to those of the manually annotated blood vessel diameter. Thus, it may be seen that the measurement results obtained by using the super-resolution technology are closer to manually annotated results, which proves that the measurement accuracy of the blood vessel diameter is effectively improved by using the super-resolution technology.

In some examples, the blood vessel diameter may be converted into an actual size. Specifically, an image including a scale may be input when the fundus image is acquired. The scale is provided with degree scales. In some examples, edge detection may be performed on the image including the scale based on an image processing algorithm to obtain an area of which the degree scales are clearer on the scale, and then, a scale range corresponding to the area may be acquired, for example, the scale range may be 2 μm (micrometer) to 100 μM (micrometer). Distances between the pixel points may be obtained based on the scale range and the number of the pixel points within the scale range in the fundus image. In some examples, an actual size may be obtained by virtue of the scale range, for example, 98 μM (micrometer) is divided by the number of the pixel points within the scale range in the fundus image to obtain the distances between the pixel points. In this case, the blood vessel diameter may be converted into the actual size by multiplying the blood vessel diameter by the distances between the pixel points.

Examples of the present disclosure are not limited thereto. In other examples, a pixel spacing (the actual size represented by a distance between every two pixel points in the fundus image) may be acquired based on the fundus image in a format of DICOM (Digital Imaging and Communications in Medicine). In this case, the blood vessel diameter may be converted into the actual size by multiplying the blood vessel diameter by the pixel spacing. In other examples, the blood vessel diameter may not be converted into the actual size, for example, the blood vessel diameter may be used as an intermediate result.

Figure 13:
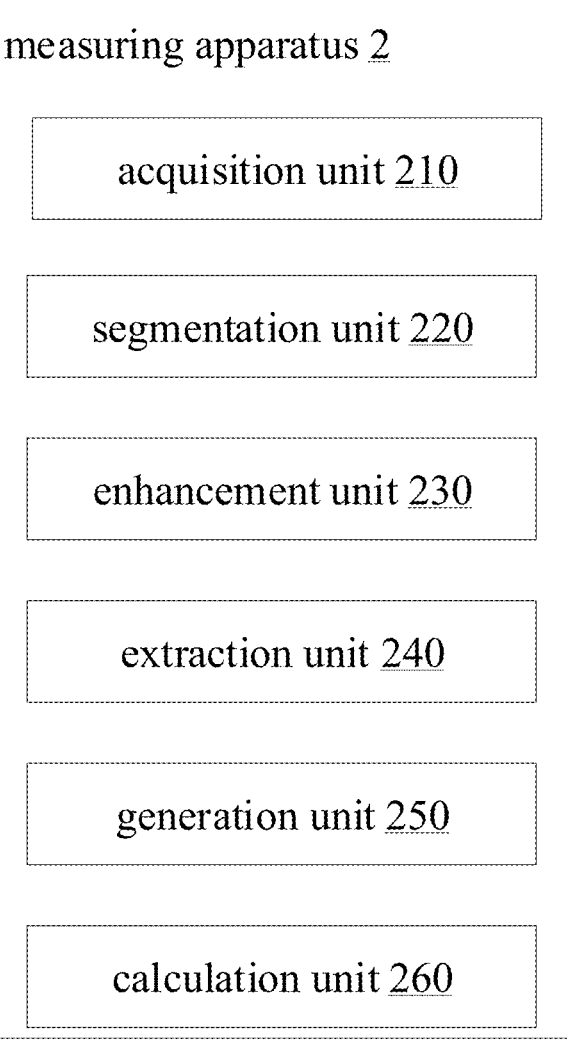
FIG. 13 is a system block diagram showing a measuring apparatus of a blood vessel diameter of a fundus image according to an embodiment of the disclosure

Hereinafter, a measuring apparatus of a blood vessel diameter of a fundus image related to the present disclosure will be described in detail with reference to FIG. 13. The measuring apparatus of the blood vessel diameter of the fundus image in the present disclosure may be referred to as "measuring apparatus" for short. The measuring apparatus is configured to perform the above-mentioned measuring method. FIG. 13 is a system block diagram showing a measuring apparatus of a blood vessel diameter of a fundus image according to an embodiment of the disclosure.

In some examples, as shown in FIG. 13, a measuring apparatus 2 may include an acquisition unit 210, a segmentation unit 220, an enhancement unit 230, an extraction unit 240, a generation unit 250, and a calculation unit 260. The acquisition unit 210 may be configured to acquire a fundus image. The segmentation unit 220 may be configured to perform blood vessel segmentation on the fundus image. The enhancement unit 230 may be configured to perform resolution enhancement on a blood vessel segmentation image. The extraction unit 240 may be configured to acquire a continuous blood vessel skeleton and a vessel diameter measurement direction. The generation unit 250 may be configured to generate a blood vessel contour. The calculation unit 260 may be configured to calculate a blood vessel diameter. In this case, the resolution of a blood vessel in the fundus image may be increased, and then, the blood vessel diameter may be measured by using more pixel points. Therefore, automatic super-resolution measurement may be performed on the blood vessel diameter, and the measurement accuracy may be improved.

In some examples, the acquisition unit 210 may be configured to acquire the fundus image. The fundus image may include a blood vessel. In some examples, the fundus image may be a color fundus image. In some examples, the fundus image may be pre-processed. Specific contents may refer to the step S210, the descriptions thereof are omitted herein.

In some examples, the segmentation unit 220 may be configured to perform blood vessel segmentation on the fundus image acquired by the acquisition unit 210. In some examples, a blood vessel segmentation image may be generated based on the fundus image. In some examples, blood vessel segmentation may be performed on the fundus image by virtue of an artificial neural network. In this case, based on the artificial neural network, features of a blood vessel may be automatically learned, and a blood vessel segmentation result may be output. Specific contents may refer to the step S220, the descriptions thereof are omitted herein.

In some examples, the enhancement unit 230 may be configured to perform resolution enhancement on the blood vessel segmentation image. In some examples, resolution enhancement may be performed on the blood vessel segmentation image according to a preset multiply to generate an enhanced blood vessel segmentation image. In some examples, resolution enhancement may be performed on the blood vessel segmentation image by using a linear interpolation method. In some examples, the preset multiply may be an integer greater than 1. Therefore, the resolution of the blood vessel in the fundus image may be increased, and then, the measurement accuracy of subsequent measurement for the blood vessel diameter may be improved. Specific contents may refer to the step S230, the descriptions thereof are omitted herein.

In some examples, the extraction unit 240 may be configured to acquire the continuous blood vessel skeleton and the vessel diameter measurement direction. In some examples, after the enhanced blood vessel segmentation image generated by the enhancement unit 230 is acquired, blood vessel skeletons in the enhanced blood vessel segmentation image may be extracted. The blood vessel skeletons may be center lines of blood vessels. In some examples, the enhanced blood vessel segmentation image may be thinned by employing a morphological thinning algorithm to extract the blood vessel skeletons. In some examples, before the blood vessel skeletons are extracted from the enhanced blood vessel segmentation image, median filtering operation may be performed on the enhanced blood vessel segmentation image. Therefore, bifurcation possibly occurring on tail ends of the blood vessel skeletons may be eliminated. In some examples, the blood vessel skeletons may be fitted to acquire the continuous blood vessel skeleton. In some examples, the blood vessel skeletons may be fitted by using a least square cubic spline interpolation algorithm. Therefore, the continuous blood vessel skeleton and a fitting equation may be obtained.

In some examples, the extraction unit 240 may be configured to acquire the vessel diameter measurement direction of measurement pixel points. The measurement pixel points may be a plurality of pixel points on the continuous blood vessel skeleton. In some examples, the vessel diameter measurement direction may be perpendicular to a tangent line of the continuous blood vessel skeleton on the measurement pixel points. Specific contents may refer to the step S240, the descriptions thereof are omitted herein.

In some examples, the generation unit 250 may be configured to generate the blood vessel contour. In some examples, the blood vessel contour corresponding to the measurement pixel points may be generated based on the enhanced blood vessel segmentation image acquired by the enhancement unit 230, the measurement pixel points acquired by the extraction unit 240, the vessel diameter measurement direction of the measurement pixel points acquired by the extraction unit 240, and preset precision. In some examples, an interpolation algorithm is used to perform an interpolation operation on the enhanced blood vessel segmentation image based on the enhanced blood vessel segmentation image, the measurement pixel points, the vessel diameter measurement direction of the measurement pixel points, and the preset precision to generate the blood vessel contour corresponding to the measurement pixel points. Therefore, the interpolation operation may be performed on the enhanced blood vessel image based on the preset precision. In some examples, the interpolation algorithm may be a cubic spline interpolation algorithm. Therefore, the interpolation operation may be performed on the enhanced blood vessel segmentation image by using the cubic spline interpolation algorithm. Specific contents may refer to the step S220, the descriptions thereof are omitted herein.

In some examples, in the generation unit 250, the preset precision may be a decimal greater than 0 and less than 1. Therefore, the resolution of the blood vessel in the fundus image may be enhanced, and then, the measurement accuracy of subsequent measurement for the blood vessel diameter may be improved. In some examples, the width of the blood vessel contour may be N times as large as the maximum blood vessel diameter. N may be an integer ranging from 2 to 5. In some examples, the blood vessel contour corresponding to each of the measurement pixel points may be arranged in a central colinear manner side by side according to an arrangement order of the measurement pixel points on the continuous blood vessel skeleton to form a straightened blood vessel image. Specific contents may refer to the step S250, the descriptions thereof are omitted herein.

In some examples, the calculation unit 260 may be used for calculating the blood vessel diameter. In some examples, the blood vessel diameter corresponding to the measurement pixel points may be calculated based on the number of the blood vessel pixel points in the blood vessel contour corresponding to the measurement pixel points, the preset multiple, and the preset precision. In some examples, the number n of the blood vessel pixel points in the blood vessel contour corresponding to the measurement pixel points may be calculated according to the following formula:

$$n = \mathrm{card}(\{p : p \in P, f(p) > T\}).$$

Here, p is the measurement pixel points, f(p) is pixel values corresponding to the measurement pixel points p, T is a preset threshold parameter, P is a pixel point set in the blood vessel contour corresponding to the measurement pixel points p, and card represents a cardinality of the set. Therefore, the number of the blood vessel pixel points in the blood vessel contour corresponding to the measurement pixel points may be calculated. In some examples, T may be 0.9. Therefore, the blood vessel pixel points and non-blood vessel pixel points in the blood vessel contour corresponding to the measurement pixel points may be distinguished. In some examples, the blood vessel diameter; corresponding to the measurement pixel points may be:

$$l=n\times s/e.$$

Here, n is the number of the blood vessel pixel points in the blood vessel contour corresponding to the measurement pixel points, s is the preset precision, and e is the preset multiple. Therefore, the blood vessel diameter may be calculated. Specific contents may refer to the step S260, the descriptions thereof are omitted herein.

In the present disclosure, the blood vessel segmentation image is enhanced to generate the enhanced blood vessel segmentation image; the blood vessel skeletons are extracted from the enhanced blood vessel segmentation image and are fitted to obtain the continuous blood vessel skeleton and the vessel diameter measurement direction; the blood vessel contour corresponding to the measurement pixel points is generated based on the enhanced blood vessel segmentation image, the measurement pixel points on the continuous blood vessel skeleton, the vessel diameter measurement direction of the measurement pixel points, and the preset precision; and the blood vessel diameter corresponding to the measurement pixel points is calculated based on the number of the blood vessel pixel points in the blood vessel contour corresponding to the measurement pixel points, the preset multiple, and the preset precision. In this case, the resolution of a blood vessel in the fundus image may be enhanced, and then, the blood vessel diameter may be measured by using more pixel points. Therefore, the measurement accuracy of the blood vessel diameter may be improved.

Various embodiments of the disclosure may have one or more of the following effects. In some embodiments, the present disclosure may be proposed in view of the previously mentioned situations in prior art and may help to provide a measuring method and a measuring apparatus of a blood vessel diameter of a fundus image. In other embodiments, automatic super-resolution measurement may be performed on a blood vessel diameter and higher measurement accuracy may be achieved.

Although the present disclosure has been described in detail with reference to the accompanying drawings and examples as above, it may be understood that the above description does not limit the present disclosure in any form. The present disclosure may be modified and varied as needed by those skilled in the art without departing from the essential spirit and scope of the present disclosure, and such modifications and variations fall within the scope of the present disclosure.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. A method for measuring a blood vessel diameter of a fundus image, comprising:

acquiring the fundus image including the blood vessel;

generating a blood vessel segmentation image based on the fundus image;

performing resolution enhancement on the blood vessel segmentation image according to a preset multiple to generate an enhanced blood vessel segmentation image;

extracting blood vessel skeletons from the enhanced blood vessel segmentation image and performing fitting on the blood vessel skeletons to obtain a continuous blood vessel skeleton and a vessel diameter measurement direction of measurement pixel points, the measurement pixel points being a plurality of pixel points on the continuous blood vessel skeleton and the vessel diameter measurement direction being perpendicular to a tangent line of the continuous blood vessel skeleton on the measurement pixel points;

generating a blood vessel contour corresponding to the measurement pixel points based on the enhanced blood vessel segmentation image, the measurement pixel points, the vessel diameter measurement direction of the measurement pixel points, and preset precision; and calculating a blood vessel diameter corresponding to the measurement pixel points based on a number of blood vessel pixel points in the blood vessel contour corresponding to the measurement pixel points, the preset multiple, and the preset precision;

wherein:

a blood vessel diameter/corresponding to the measurement pixel points is:

$$l=n\times s/e,$$

wherein:

n is the number of the blood vessel pixel points in the blood vessel contour corresponding to the measurement pixel points, s is the preset precision, and e is the preset multiple; and n is calculated according to following formula:

$$n=\text{card}(\{p{:}p\in P,f(p)>T\}),$$

wherein:

p is the measurement pixel points, f(p) is pixel values corresponding to the measurement pixel points p, T is a preset threshold parameter, P is a pixel point set in the blood vessel contour corresponding to the measurement pixel points p, and card represents a cardinality of the pixel point set.

2. The method of claim 1, further comprising:

acquiring a width of the blood vessel contour through a predicted maximum blood vessel diameter;

acquiring an interpolation sampling interval based on the width of the blood vessel contour; and performing an interpolation operation on the enhanced blood vessel segmentation image based on the interpolation sampling interval to generate a blood vessel contour corresponding to the measurement pixel points.

3. The method of claim 2, characterized in that, an interpolation algorithm is used to perform the interpolation operation on the enhanced blood vessel segmentation image to generate the blood vessel contour corresponding to the measurement pixel points, based on the enhanced blood vessel segmentation image, the measurement pixel points, the vessel diameter measurement direction of the measurement pixel points, and the preset precision.

4. The method of claim 1, characterized in that, T is 0.9.

5. The method of claim 1, characterized in that:

the preset multiple is an integer greater than 1, and the preset precision is a decimal greater than 0 and less than 1.

6. The method of claim 1, characterized in that:

the step of extracting blood vessel skeletons from the enhanced blood vessel segmentation image and performing fitting on the blood vessel skeletons further comprises:

fitting the blood vessel skeletons to obtain the continuous blood vessel skeleton and a fitting equation, and acquiring a tangent line of the measurement pixel points by a first derivative of the fitting equation.

7. The method of claim 1, characterized in that, the blood vessel segmentation image is a binary image.

8. The method of the blood vessel diameter of the fundus image of claim 1, characterized in that:

the blood vessel diameter is converted into an actual size by multiplying the blood vessel diameter by a distance between the pixel points, and the distance between the pixel points is an actual size represented by a distance between every two pixel points in the fundus image.

9. A apparatus for measuring a blood vessel diameter of a fundus image, the apparatus comprising:

an acquisition unit configured to acquire the fundus image including the blood vessel;

a segmentation unit configured to generating a blood vessel segmentation image based on the fundus image;

an enhancement unit configured to perform resolution enhancement on the blood vessel segmentation image according to a preset multiple to generate an enhanced blood vessel segmentation image;

an extraction unit configured to extract blood vessel skeletons from the enhanced blood vessel segmentation image and to perform fitting on the blood vessel skeletons to obtain a continuous blood vessel skeleton and a vessel diameter measurement direction of measurement pixel points, the measurement pixel points being a plurality of pixel points on the continuous blood vessel skeleton and the vessel diameter measurement direction being perpendicular to a tangent line of the continuous blood vessel skeleton on the measurement pixel points;

a generation unit configured to generate a blood vessel contour corresponding to the measurement pixel points based on the enhanced blood vessel segmentation image, the measurement pixel points, the vessel diameter measurement direction of the measurement pixel points, and preset precision; and a calculation unit configured to calculate a blood vessel diameter corresponding to the measurement pixel points based on a number of blood vessel pixel points in the blood vessel contour corresponding to the measurement pixel points, the preset multiple, and the preset precision;

wherein:

a blood vessel diameter/corresponding to the measurement pixel points is:

$$l = n \times s / e,$$

wherein:

n is the number of the blood vessel pixel points in the blood vessel contour corresponding to the measurement pixel points, s is the preset precision, and e is the preset multiple; and n is calculated according to following formula:

$$n = \mathrm{card}(\{p{:}p{\in}P, f(p){>}T\}),$$

wherein:

p is the measurement pixel points, f(p) is pixel values corresponding to the measurement pixel points p, T is a preset threshold parameter, P is a pixel point set in the blood vessel contour corresponding to the measurement pixel points p, and card represents a cardinality of the pixel point set.

10. The apparatus of claim 9, characterized in that:

the preset multiple is an integer greater than 1, and the preset precision is a decimal greater than 0 and less than 1.

11. The apparatus of claim 9, characterized in that, an interpolation algorithm is used to perform an interpolation operation on the enhanced blood vessel segmentation image to generate the blood vessel contour corresponding to the measurement pixel points, based on the enhanced blood vessel segmentation image, the measurement pixel points, the vessel diameter measurement direction of the measurement pixel points, and the preset precision.

12. The apparatus of claim 11, characterized in that, the apparatus is further configured to:

acquire a width of the blood vessel contour through a predicted maximum blood vessel diameter;

acquire an interpolation sampling interval based on the width of the blood vessel contour; and perform an interpolation operation on the enhanced blood vessel segmentation image based on the interpolation sampling interval to generate a blood vessel contour corresponding to the measurement pixel points.

13. The apparatus of claim 9, characterized in that, T is 0.9.

14. The apparatus of claim 9, characterized in that, the extraction unit is further configured to:

fit the blood vessel skeletons to obtain the continuous blood vessel skeleton and a fitting equation, and acquire a tangent line of the measurement pixel points by a first derivative of the fitting equation.

15. The apparatus of claim 9, characterized in that, the blood vessel segmentation image is a binary image.

16. The apparatus of claim 9, characterized in that:

the blood vessel diameter is converted into an actual size by multiplying the blood vessel diameter by a distance between the pixel points, and the distance between the pixel points is an actual size represented by a distance between every two pixel points in the fundus image.

* * * * *